United States Patent
Koegler et al.

(10) Patent No.: US 6,786,194 B2
(45) Date of Patent: Sep. 7, 2004

(54) VARIABLE FUEL DELIVERY SYSTEM AND METHOD

(75) Inventors: John M. Koegler, Corvallis, OR (US); John Da Cunha, Corvallis, OR (US); Donald J. Coulman, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/284,880

(22) Filed: Oct. 31, 2002

(65) Prior Publication Data

US 2004/0084023 A1 May 6, 2004

(51) Int. Cl.[7] ............................................. F02M 43/00
(52) U.S. Cl. ..................................... 123/304; 123/575
(58) Field of Search ............................... 123/304, 575, 123/590, 299, 300, 577

(56) References Cited

U.S. PATENT DOCUMENTS

| | | | |
|---|---|---|---|
| 3,717,875 A | * | 2/1973 | Arciprete et al. .............. 347/73 |
| 4,481,921 A | * | 11/1984 | Tsukahara et al. .......... 123/304 |
| 4,499,861 A | * | 2/1985 | Wiegand et al. ............. 123/1 A |
| 4,499,862 A | * | 2/1985 | Baumer et al. ............... 123/1 A |
| 5,208,605 A | | 5/1993 | Drake |
| 5,315,973 A | * | 5/1994 | Hill et al. .................... 123/304 |
| 5,437,255 A | | 8/1995 | Sadley et al. |
| 5,832,880 A | * | 11/1998 | Dickey ........................ 123/25 C |
| 6,073,862 A | * | 6/2000 | Touchette et al. ........... 239/408 |
| 6,309,062 B1 | | 10/2001 | Hickman et al. |
| 6,378,489 B1 | * | 4/2002 | Stanglmaier et al. ........ 123/304 |
| 6,439,192 B1 | * | 8/2002 | Ouellette et al. ........... 123/299 |
| 2002/0063752 A1 | | 5/2002 | Clark |
| 2002/0105556 A1 | | 8/2002 | Pujii |

FOREIGN PATENT DOCUMENTS

| | | |
|---|---|---|
| EP | 0527362 | 8/1991 |
| EP | 0811492 | 12/1997 |
| WO | WO 00/32927 | 6/2000 |
| WO | WO 01/92715 | 12/2001 |

* cited by examiner

Primary Examiner—Mahmoud Gimie

(57) ABSTRACT

An improved fuel injector is disclosed. In one embodiment of the invention, the fuel injector includes a first fluid input for receiving a first fluid; a second fluid input for receiving a second fluid; and a drop ejector configured to discretely eject fluid in a digital manner, wherein the drop ejector is further configured to receive the first and second fluids and to eject discrete droplets of the first fluid and discrete droplets of the second fluid. In another embodiment of the invention, the fuel injector includes a drop ejector configured to discretely eject fluid in a digital manner, wherein the drop ejector includes a first set of firing chambers and a second set of firing chambers, wherein each firing chamber of the first set has a first volume, and wherein each firing chamber of the second set has a second volume.

27 Claims, 6 Drawing Sheets

VARIABLE FUEL DELIVERY SYSTEM AND METHOD

FIELD OF THE INVENTION

The present invention generally relates to, for example, fuel delivery in internal combustion engines.

BACKGROUND

Internal combustion engines generate power by causing a mixture of air and combustible fuel, such as gasoline, to ignite and burn in one or more combustion chambers, such as combustion cylinders in an automobile. Conventionally, combustible fuel has been directed into the combustion chambers in a vapor form using either a carburetor or a fuel injector. Common fuel injectors are either continuous or pulsed. The continuous fuel injectors direct the combustible vapor into an intake manifold, and when an intake valve opens, the vapor is drawn into the combustion chamber by a piston. The pulsed fuel injectors direct fuel vapor on command into either a region upstream of each intake valve or directly into the combustion chambers. Both of these fuel delivery systems are highly developed, well known, and have been in use for decades.

In the internal combustion engine industry, it is an ongoing quest to achieve higher and higher fuel efficiency and to minimize harmful emissions into the atmosphere. To further both of these goals, one known approach is to use a gasoline/ethanol mixture as the fuel for the engine. The gasoline/ethanol mixture, which commonly comprise 90% gasoline and 10% ethanol, is created at oil refineries and injected into the vehicle combustion chambers with conventional fuel injectors. However, for a variety of reasons, including different evaporation rates and the relative stability of the respective mixture components, the gasoline/ethanol mixtures are generally not sufficiently precise by the time they reach the end consumer. As a result, some consumers that use a gasoline/ethanol mixture in their vehicles experience poor engine performance.

Another problem experienced by internal combustion engines that use conventional fuel injectors to direct fuel vapor into the combustion chambers is that they produce a relatively large amount of emissions during a cold start-up (i.e., start-up when the engine is at approximately ambient temperature). During operation of the engine at its normal operating temperature, it is desirable that average diameters of the fuel drops provided to the combustion chamber by the fuel injector be relatively large because the heat of the engine evaporates some of the fuel vapor. However, during a cold start-up, the relatively large fuel drops tend to condense on the cold metal wall of the combustion chamber (thereby remaining in liquid form). To ensure that sufficient fuel vapor exists in the combustion chamber to ignite, excess fuel is normally directed into the combustion chamber before or during a cold start-up. The excess fuel results in a certain amount of unburned fuel being expelled from the engine, which is undesirable.

SUMMARY

The present invention relates to an improved fuel injector. In one embodiment of the invention, the fuel injector includes a first fluid input for receiving a first fluid; a second fluid input for receiving a second fluid; and a drop ejector configured to discretely eject fluid in a digital manner, wherein the drop ejector is further configured to receive the first and second fluids and to eject discrete droplets of the first fluid and discrete droplets of the second fluid. In another embodiment of the invention, the fuel injector includes a drop ejector configured to discretely eject fluid in a digital manner, wherein the drop ejector includes a first set of firing chambers and a second set of firing chambers, wherein each firing chamber of the first set has a first volume, and wherein each firing chamber of the second set has a second volume.

BRIEF DESCRIPTION OF THE DRAWINGS

The invention is better understood with reference to the following drawings. The elements of the drawings are not necessarily to scale relative to each other. Rather, emphasis has instead been placed upon clearly illustrating the invention. Furthermore, like reference numerals designate corresponding similar parts through the several views.

DETAILED DESCRIPTION

An embodiment of an improved fuel injector for injecting combustible fuel into a combustion chamber of an internal combustion engine is hereinafter described. The improved fuel injector delivers a combustible vapor, which is derived from fixed quantum fuel droplets, to a combustion chamber. In one aspect of the invention, the fuel injector is configured to be able to deliver a plurality of fuel-types substantially simultaneously from a single fuel injector. In another aspect of the invention, the fuel injector is configured to create a combustible vapor from fuel droplets having two or more different and fixed diameters.

Figure 1:
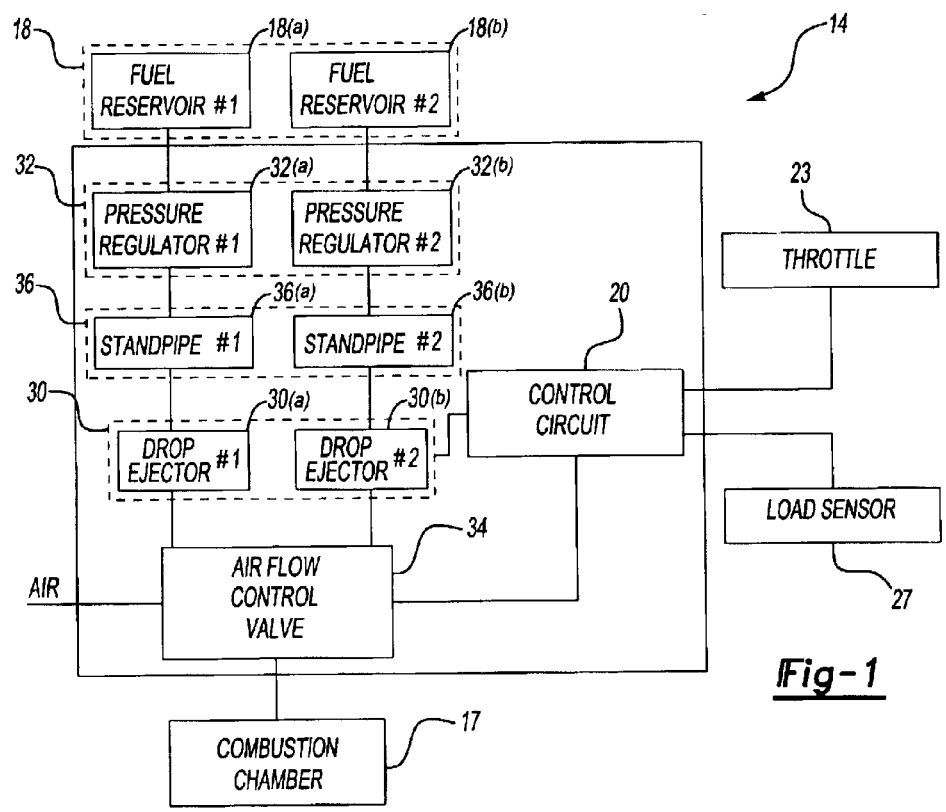
FIG. 1 is a block diagram of an exemplary embodiment of the fuel delivery system of the present invention.

FIG. 1 is a high-level block diagram of one embodiment of a system employing an improved fuel injector according to the present invention. Reference numeral 14 generally indicates an apparatus for generating a combustible vapor for an internal combustion engine, herein referred to as a "fuel injector" for brevity. A fuel injector 14 includes a drop ejector 30 and an airflow control valve 34. The drop ejector 30 creates discrete droplets of fuel of fixed quantums. The drop ejector 30 is fluidically connected, preferably under low pressure, to a fuel reservoir 18, such as a fuel tank, containing combustible fuel. The fuel from the fuel reservoir 18 is preferably delivered to the drop ejector 30 using a pressure regulator 32 and an operational standpipe 36 to prevent fuel leakage from the drop ejector 30 in non-use situations. Preferably, the drop ejector 30 is removable and replaceable by a typical consumer. A control circuit 20 controls the drop ejector 30 and airflow control valve 34. The control circuit 20 is preferably connected to a throttle 23 and a load sensor 27. The throttle 23, such as an accelerator pedal in an automobile, is actuated by a user. The optional load sensor 27 monitors and senses the load of the combustible fuel device powered by the internal combustion engine when appropriate. The airflow control valve 34 regulates the flow of air that is mixed with the fuel droplets ejected from the drop ejector 30 to create a combustible vapor, which is delivered into a combustion chamber 17, such as a typical combustion cylinder in an automobile. The fuel vapor that is delivered to the combustion chamber is ignited by an ignition device (not shown), such as a sparkplug, in a manner known in the art. While FIG. 1 shows only one combustion chamber 17 (for purposes of illustration), the present invention may be implemented with one or more combustion chambers 17, wherein additional combustion chambers 17 would correspond to additional drop ejectors 30 and airflow control valves 34, all of which being controlled by control circuit 20. Further, depending on the number of fuels used simultaneously in the system, the number of pressure regulators 32, standpipes 38, and drop ejectors 30 would vary. For example, FIG. 1 illustrates an embodiment of the invention wherein two fuels (or other liquids) would be dispensed by the fuel injector 14. Accordingly, FIG. 1 illustrates the use of two pressure regulators 32(a), (b), two standpipes 38(a), (b) and two drop ejectors 30(a), (b), in addition to two fuel reservoirs 18(a), (b).

A function of the fuel injector 14 is to produce very small, metered quantum, or "digital", droplets of combustible fuel and to channel a controlled amount of air through the droplets, thereby generating a combustible vapor. The combustible vapor is drawn into the combustion chamber(s) 17 to power the engine.

Figure 2:
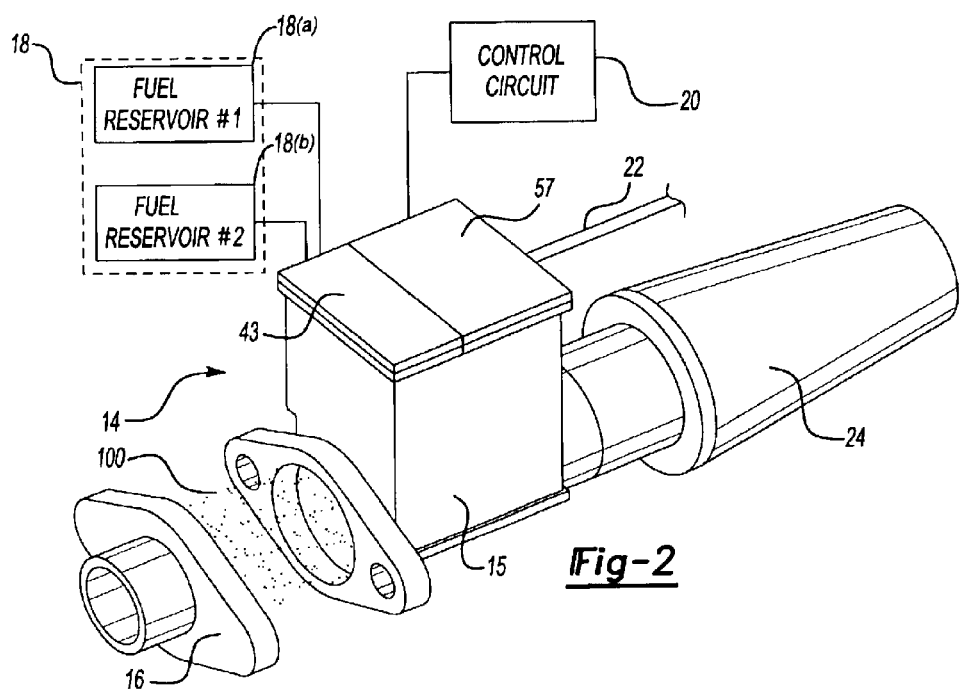
FIG. 2 is a top, side and perspective view, partially diagrammatic, of an apparatus for generating a combustible vapor for an internal combustion engine according to an exemplary embodiment of the invention.
Figure 3:
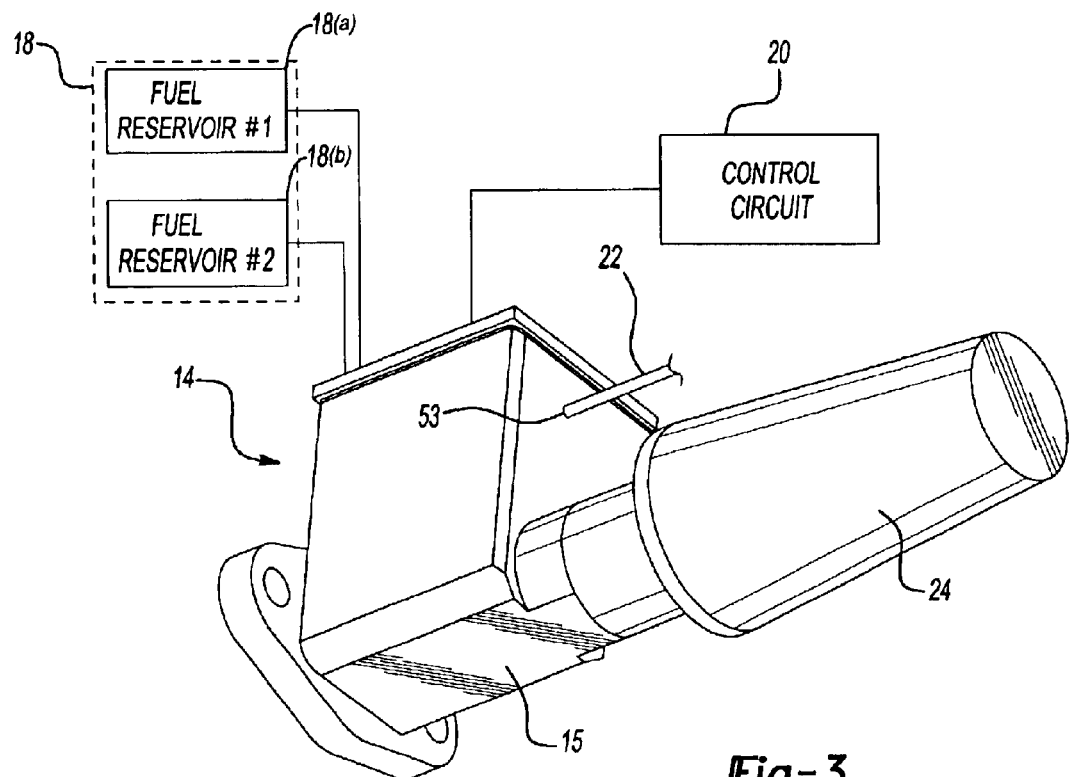
FIG. 3 is a bottom, side and perspective view, partially diagrammatic of the apparatus of FIG. 2.

Now, an embodiment of the fuel injector 14 of the present invention will be described in additional detail. FIGS. 2–10 illustrate various views and perspectives of the fuel injector 14 and its components. Referring first to FIGS. 2 and 3, the fuel injector 14 has a main body 15 that is mounted either on an intake manifold 16 of, or proximate to, the combustion chamber 17 (FIG. 1). The fuel vapor 100 produced by the fuel injector 14 passes through the intake manifold 16 into the combustion chamber 17. The main body 15 includes a first top member 43 and a second top member 57 (both of which are further described hereinafter). The fuel injector 14 is connected to control circuit 20, which generally controls the operation of the fuel injector 14 based upon input signals received from the throttle 23 (FIG. 1) and optional load sensor 27 (FIG. 1), as well as upon input signals received from a variety of other sensors and input devices. Throttle cable 22 is preferably connected to either a manual throttle or a foot pedal (not shown) and through a small hole 53 to the fuel injector 14. Physical actuation of the throttle cable 22 causes control signals to be provided to control circuit 20, which in turn controls the operation of the drop ejector 30 and air control valve 34 (FIG. 1). For example, as described below, when the throttle cable 22 is pulled away from the main body 15, the control circuit 20 causes the fuel injector 14 to further open the airflow control valve channel and thereby channel additional air into the engine. Preferably, a conventional air filter 24 removes any particulate matter in the air stream entering the fuel injector 14.

The fuel injector 14 is connected to one or more fuel reservoirs 18, such as a fuel tank in an automobile. The embodiment of the invention shown in FIGS. 2 and 3 illustrate two fuel reservoirs 18(a) and 18(b), which allows the fuel injector to provide a combustible fuel vapor comprised from a mixture of two different combustible fuels, such as gasoline and ethanol, for example, as described in more detail below. Where the invention is used to provide a combustible vapor comprised from a single fuel, a single fuel reservoir 18 can be used. Similarly, where the invention is used to provide a combustible vapor comprised from three or more fuels, a corresponding number of fuel reservoirs would be used. The fuel reservoirs 18(a) and 18(b) may or may not be connected to fuel pumps (not shown). However, it is preferable to gravity feed the fuels from the fuel reservoirs 18(a) and 18(b) to the fuel injector 14 because the fuel injector 14 of the present invention requires only a minimal fuel pressure, and gravity feed methods are less expensive than fuel pumps. The fuel can be any type of gasoline, Diesel fuels, alcohols, fuel oils and kerosenes. In short, any combustible fuel or fuel combination that will power an internal combustion engine or other combustible fuel device, such as lanterns, stoves, heaters and generators, are acceptable in connection with the present invention.

Figure 4:
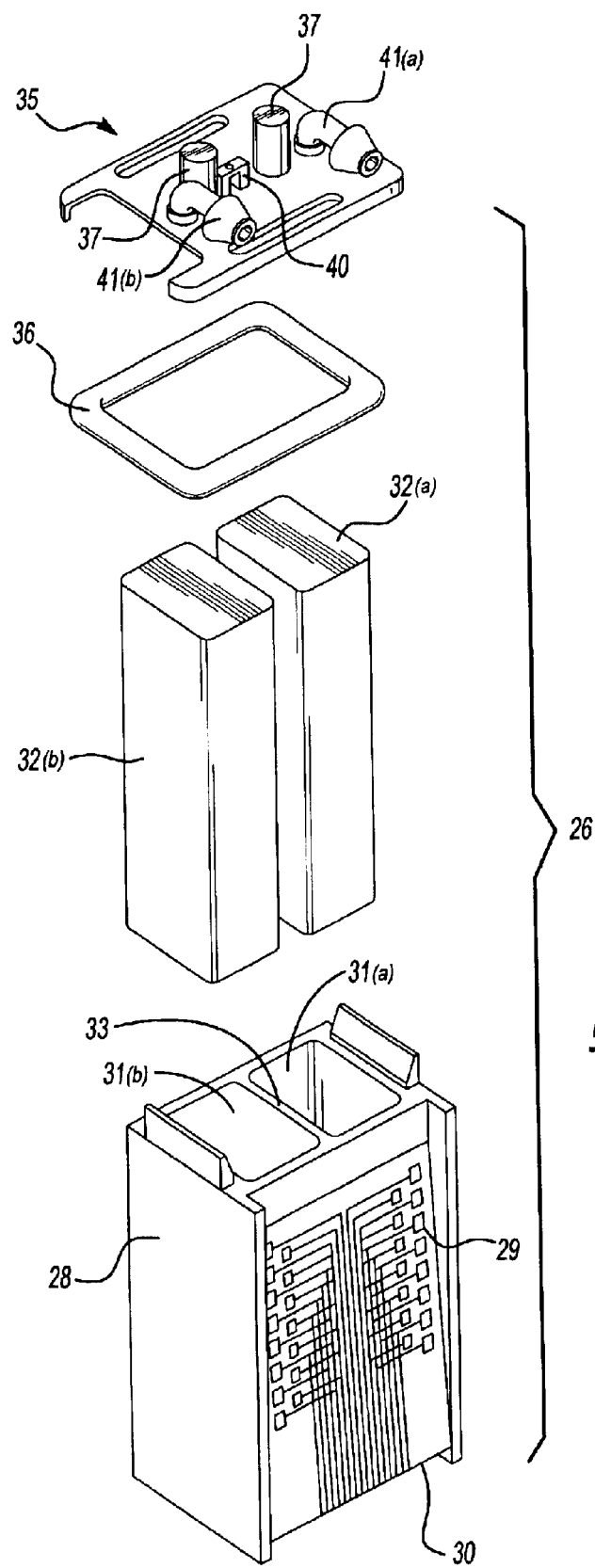
FIG. 4 is an exploded view of the micro-pump of the apparatus of FIG. 2.

With reference to FIG. 4, a slide body 26 contained inside of fuel injector 14 primarily performs the function of creating the combustible vapor 100 that is provided to the combustion chamber(s) 17. Slide body 26 is contained inside of fuel injector housing 15 (FIGS. 2 & 3). The slide body 26, which is preferably easily replaceable by a consumer, functions both as a micro-pump, which expels small fuel droplets, and an air control valve 34, which regulates the amount of air directed into the stream of fuel droplets produced by the micro-pump to create the fuel vapor. The slide body 26 is similar to and operates in essentially the same manner as a thermal ink jet print cartridge known to those of skill in that art. In this exemplary embodiment, the slide body 26 includes a housing 28, upon which is mounted a TAB circuit 29. Other forms of interconnection are known to those skilled in the art and can be substituted for the TAB circuit 29 and still remain within the spirit and scope of the invention. The TAB circuit 29 is electrically connected to the control circuit 20 and a drop ejector 30 located on the bottom wall of the housing 28. The TAB circuit 29 controls the drop ejector 30 based upon control signals from the control circuit 20. An exemplary drop ejector is generally described in commonly-owned U.S. Pat. No. 6,162,589 entitled "Direct Imaging Polymer Fluid Jet Orifice" issued on Dec. 19, 2000 to Chen et al, and herein incorporated by reference, though various exemplary features of a drop ejector 30 are described hereinafter with respect to FIGS. 9 and 10.

Housing 28 further encompasses a pressure regulator 32, which is preferably comprised of reticulated foam (as illustrated in FIG. 4) but can also comprise many other forms of pressure regulators, such as a spring bag or a flexible diaphragm. In the embodiment shown in FIG. 4, the pressure regulator 32 actually comprises two separate pressure regulators 32(a) and 32(b), which enable the embodiment shown in FIG. 4 to receive and regulate the delivery of two different fuel-types. In embodiments of the invention that delivery only a single fuel-type or in embodiments that deliver a fuel mixture comprised of three of more fuel-types, a corresponding number of pressure regulators would be employed. In the embodiment shown in FIG. 4, a middle wall 33 separates two cavities 31(a) and 31(b) in housing 28, which are configured to receive corresponding pressure regulators 32(*a*) and 32(*b*). Of course, in other embodiments of the invention, the number of cavities 31 would correspond to the number of fuel-types used to create the combustible fuel vapor. For example, where a single fuel is used, wall 33 would be absent, leaving a single cavity 31. The pressure regulators 32(*a*) and 32(*b*) are in fluid communication with the drop ejector 30 through a slot or slots in the standpipe located in the bottom of the housing 28, which is described in more detail hereinafter with respect to FIGS. 9 and 10. The pressure regulators 32(*a*) and 32(*b*) place a slight negative pressure on the backside of the drop ejector 30 so that the combustible fluid does not leak or dribble out of the drop ejector 30.

The slide body 26 further includes a slide body top 35, which is designed to close the top opening of the housing 28. A gasket 36 seals the interface between the slide body top 35 and the housing 28 to prevent the fuel inside of the slide body 26 from leaking out. The gasket 36 is preferably made from EPDM or polyurethane, though other materials could also be used and remain within the spirit and scope of the invention.

Still referring to FIG. 4, various physical elements are disposed on the outer side of the slide body top 35. Outer cylindrical members 37 are incorporated to retain compression springs 46 (FIG. 6), as described in more detail below. Loop member 40 functions to couple the throttle cable to the slide body 26. As a result, actuation of the throttle cable 22 causes the slide body 26 to move within the fuel injector main body 15 so as to adjust the amount of air entering the fuel injector 14, as described in more detail below. Finally, fuel inlet conduits 41(*a*) and 41(*b*) are also disposed on the outer side of the slide body top 35. The fuel inlet conduits 41(*a*) and 41(*b*) are in fluid communication with the respective fuel reservoirs 18(*a*) and 18(*b*) (FIGS. 2 and 3), and they function to permit the flow of fluids from the respective reservoirs into the slide body 26. The fuel inlet conduits 41(*a*) and 41(*b*) are preferably flexible and resiliently deformable so that the slide body 26 can move up and down within the fuel injector without restriction from the fuel inlet conduits 41(*a*) and 41(*b*). FIG. 4 illustrates an embodiment of the invention having two fuel inlet conduits 41(*a*) and 41(*b*) so as to facilitate the production of a fuel vapor comprised from two different fuel-types. In situations where the invention is used to deliver a combustible fuel vapor comprised from one fuel-type or three or more fuel types, a corresponding number of fuel inlet conduits 41 would be employed.

Figure 5:
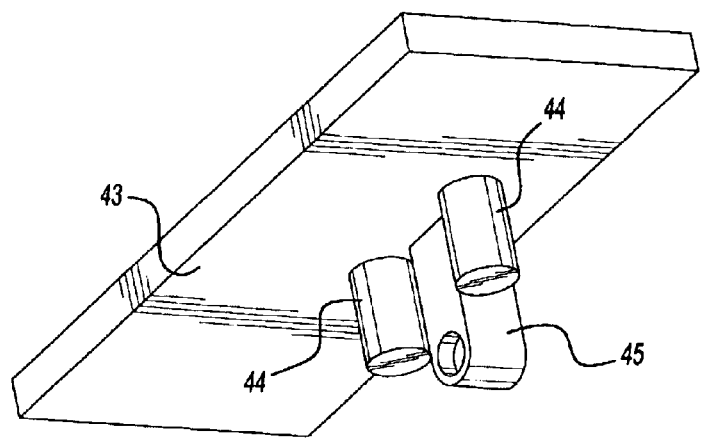
FIG. 5 is a perspective view of a component of the apparatus of FIG. 2.

FIG. 5 illustrates a preferred inner (downside) wall of the first top member 43 of fuel injector main housing 15 (shown in FIGS. 2 and 3). The inner wall of first top member 43 preferably includes inner cylindrical members 44 and throttle cable guide 45. The inner cylindrical members 44 are preferably co-axial with the outer cylindrical members 36 on the outer side of the slide body top 35 (FIG. 4) when the fuel injector 14 (FIGS. 2 &3) is fully assembled. Inner cylindrical members 44 and outer cylindrical members 37 function together to engage and retain the two compression springs 46 (described in more detail below) that provide a bias against the slide body 26 relative to the first top member 43 of the fuel injector main housing 15.

While the general operation of the fuel injector 14 of the present invention essentially functions, as described above, similarly to a thermal ink jet print cartridge, various properties of the desired fuel used, such as surface tension, chemical reactivity, and volatility, to name a few, require that modifications be made to the design of conventional thermal ink jet print cartridges and thus prevents simply replacing ink with fuel. Such changes include reducing the capillary sizes in the standpipe 36 between the backpressure regulator 32 and the drop ejector 30 to account for a lower surface tension. Other changes include selection of materials for the body 15 and backpressure regulator 32 that are resistant to the fuel's solubility, such as Nylon 6. Further, the backpressure regulation should be adapted to account for the higher volatility of the fuel. Other desirable modifications would be readily-recognized by one of ordinary skill in the art.

Figure 6:
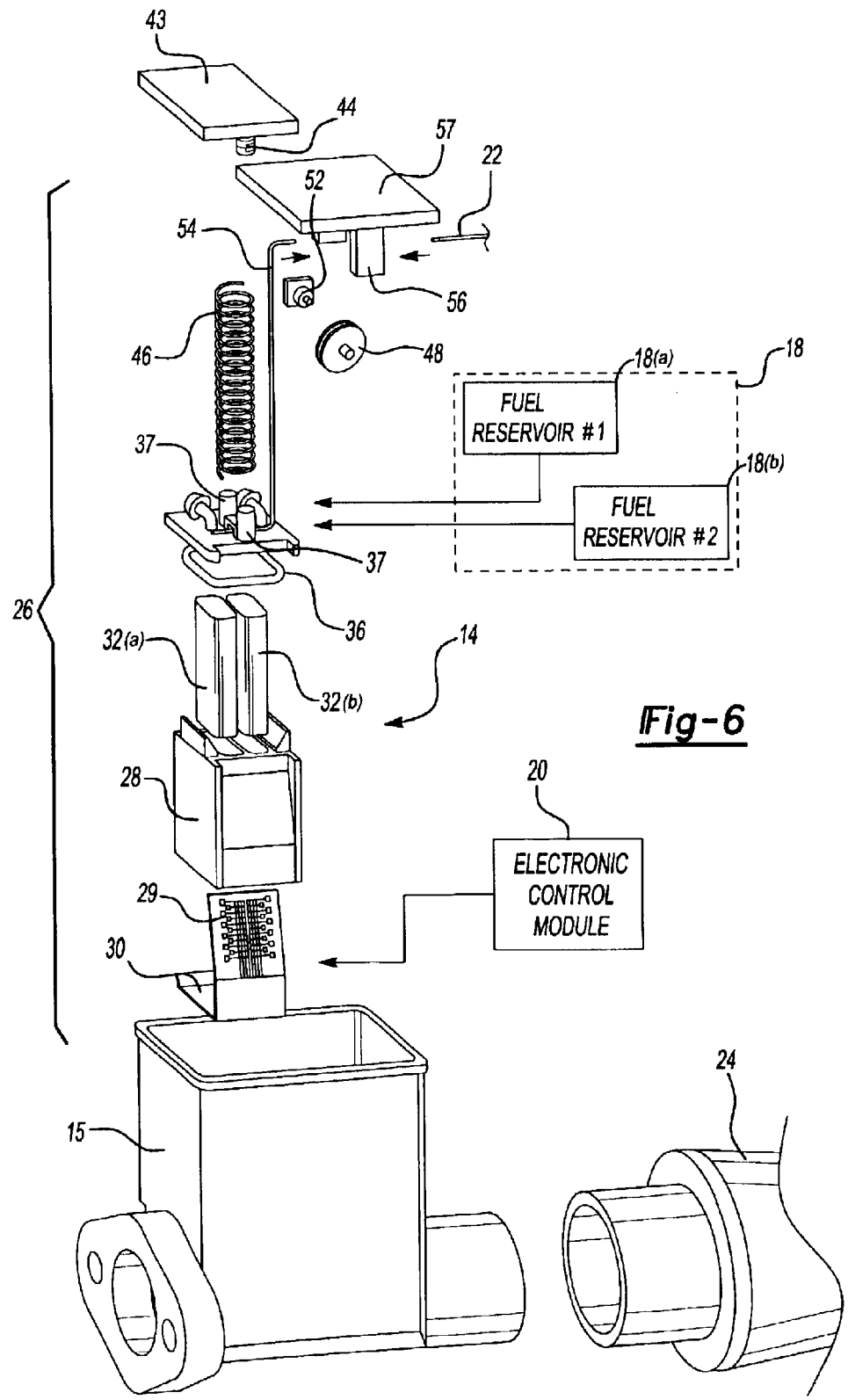
FIG. 6 is an exploded view, partially diagrammatic, of the apparatus of FIG. 2.
Figure 7:
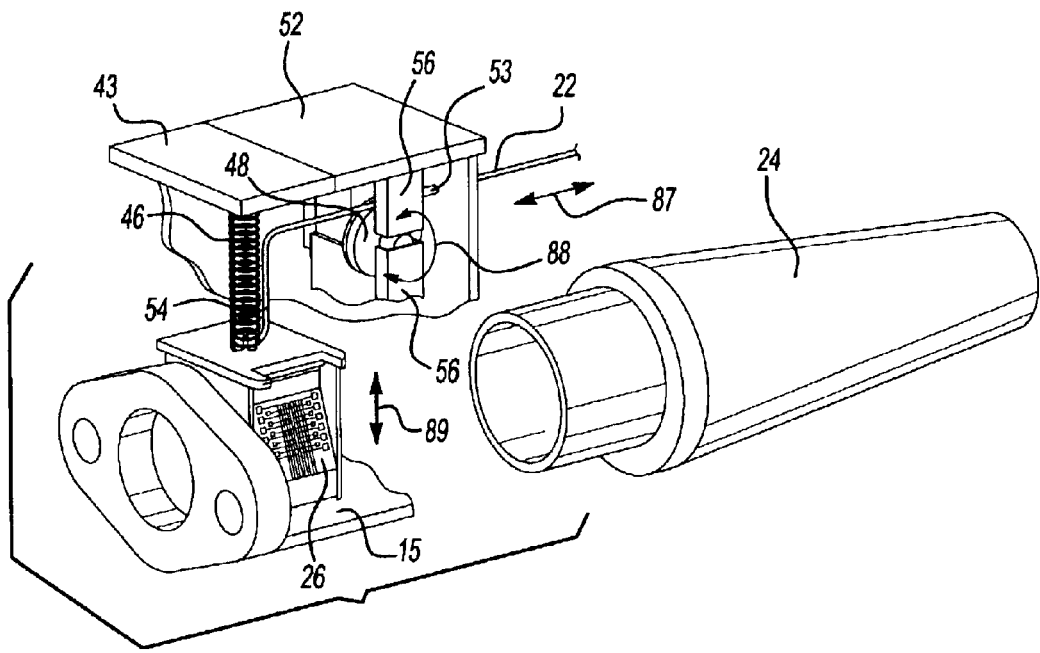
FIG. 7 is a perspective view, partially cut away, of the apparatus of FIG. 2.

FIGS. 6 and 7 both illustrate a full embodiment of the fuel injector 14 and its various components. FIG. 6 shows an exploded view of the fuel injector 14, while FIG. 7 shows an assembled cut-away view of the fuel injector 14. With reference to both FIG. 6 and FIG. 7 (where like elements have like reference numerals), the relationship of the various components of the fuel injector 14 will be described. As described above, air filter 24 is coupled to main housing 15, which provides a protected chamber to hold the various fuel injector components. The slide body 26—including drop ejector 30, TAB circuit 29, slide body housing 28, pressure regulators 32(*a*) and 32(*b*), gasket 33, and slide body top 35—is slideably disposed inside of main housing 15. The control circuit 20 communicates with TAB circuit 29 to control drop ejector 30. Fuel reservoirs 18(*a*) and 18(*b*) are fluidly connected to fuel inlet conduits 41(*a*) and 41(*b*) disposed on the outer side of the slide body top 35. When assembled, compression springs 46 (preferably manufactured from stainless steel) engage with outer cylindrical members 37 and inner cylindrical members 44 to urge the slide body 26 downward into the main body 15 and into a position that blocks the flow of air through the fuel injector 14.

Figure 8:
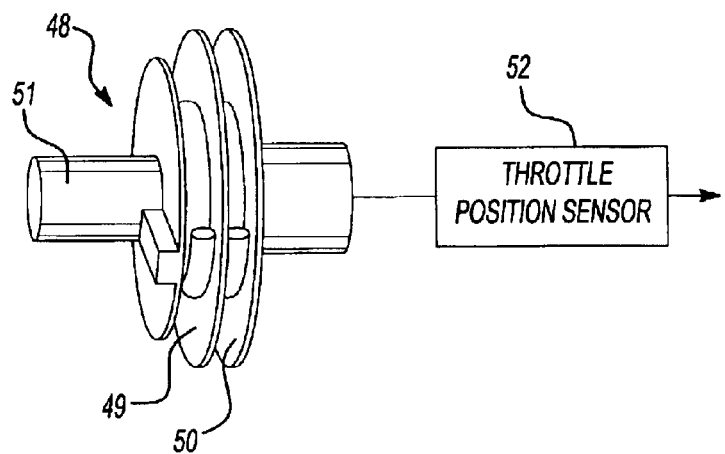
FIG. 8 is a perspective view of a component of the apparatus of FIG. 2.

Throttle cable 22 is connected (directly or indirectly) to loop member 40 to facilitate the raising of slide body 26 (thereby further opening the air passage through the fuel injector 14) in response to actuation by a user. The throttle cable 22 may be connected directly to slide body 26, or, as shown in FIGS. 6, 7 and 8, a throttle wheel 48 may be used to functionally couple throttle cable 22 (actuated by a user) to a second throttle cable 54, which is then physically coupled to the loop member 40 of slide body 26. Throttle wheel 48 is assembled to forks 56 of the second top member 57 of main housing 15. Throttle wheel 48 is configured to rotate around its center point, as illustrated by arrows 88. Both throttle cables 22, 54 are wrapped around throttle wheel 48. A throttle position sensor 52, preferably a potentiometer, is positioned inside of the main housing 15 so as to sense the position of the throttle cable 22. The throttle position sensor 52 provides an output signal to the control circuit 20, which uses this signal to adjust the amount of fuel ejected from drop ejector 30.

A purpose of the throttle wheel 48 described above is to adjust the amount of linear movement of the slide body 26 relative to the amount of linear movement of the throttle cable 22. A preferred throttle wheel 48 illustrated in FIG. 8 causes a smaller linear movement of slide body 26 relative to the actuating linear movement of throttle cable 22, thereby allowing a smaller overall fuel injector height. The throttle wheel 48 preferably has a smaller spool 49 and a larger spool 50 rigidly mounted on an axle 51. The throttle cable 22, which is connected to the throttle (not shown) passes through a small hole 53 (FIG. 7) in the main body 15 and is wrapped around the larger spool 50. The second throttle cable 54 is wrapped around the smaller spool 49. The second throttle cable 54 passes through the guide member 45 (FIG. 5) and is connected to the loop member 40 on the outer side of slide body top 35 (FIG. 4). The different diameters of the two spools 49, 50 allow the overall height of the fuel injector 14 to be reduced. When a throttle wheel 48 is used in the system, the throttle position sensor 52 is preferably connected to the throttle wheel axle 51, which measures the radial position of the throttle wheel 48 corresponding to the vertical position of the slide body 26 within the fuel injector 14 and communicates that information to the electronic control module 20.

Figures 9, 10:
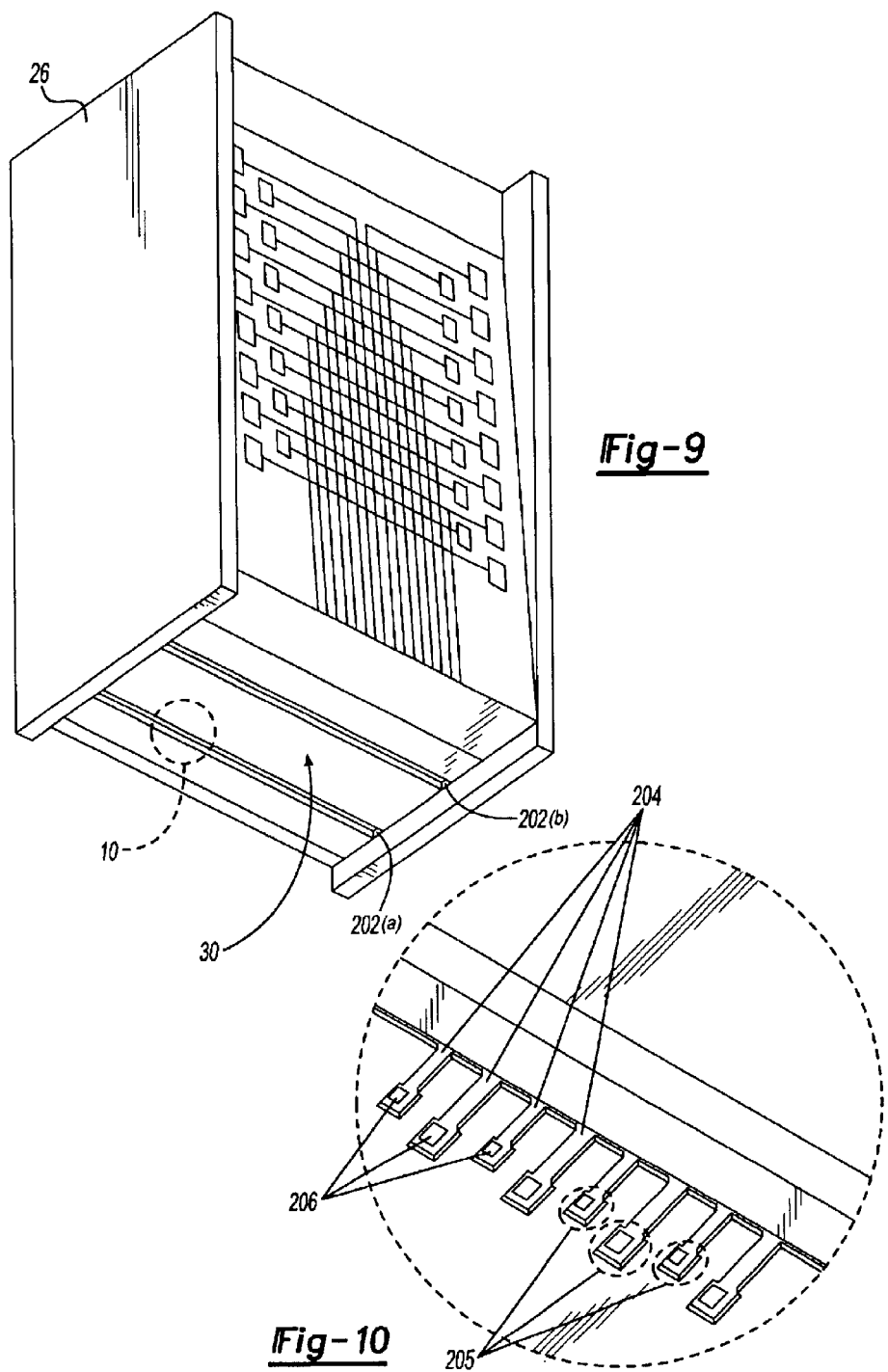
FIG. 9 is a perspective view of a slide body of a fuel injector, according to an embodiment of the present invention.
FIG. 10 is a close-up view of a portion of the slide body and drop ejector shown in FIG. 9.

FIGS. 9 and 10 illustrate additional details of an embodiment of the drop ejector 30 of the slide body 26, according to the present invention. As described in U.S. Pat. No. 6,162,589 (referenced above), an embodiment of the drop ejector 30 generally includes one or more fluid feed channels 202. The embodiment illustrated in FIG. 9 shows two fluid feed channels 202(a) and 202(b), which facilitate the delivery of fuel droplets of two different fuel-types. Embodiments of the invention that deliver a single fuel-type or more than two fuel-types would have a corresponding number of fluid feed channels 202. As shown in the magnified view of FIG. 10, each fluid feed channel 202(a) and 202(b) includes a respective plurality of fluid feed slots 204 that are in fluid communication with their respective fluid feed channel 202. Each fluid feed slot 204 includes a firing chamber 205 and an energy dissipation element 206, such as a resistor or flextentional device, disposed therein. The fluid feed channels 202(a) and 202(b) receive fuel through the respective cavities 31(a) and 31(b). The fuel flows into the fluid feed channels 202(a) and 202(b) and then into the respective fluid feed slots 204 and firing chambers 205 of the corresponding fluid feed channel. Fuel in each firing chamber 205 is heated by the corresponding energy dissipation device 206, and, as a result, fuel droplets are ejected through one or more corresponding nozzles (not shown) in the drop ejector 30. The energy dissipation devices 206 are activated in response to control signals from the control circuit 20, which is preferably responsive to engine load and throttle position when embodied in an internal combustion engine.

The embodiment of the invention illustrated in FIG. 10 shows firing chambers 205 and energy dissipation devices 206 of two different sizes being connected to each fluid feed channel 202. Depending on the application, the firing chambers 205 and energy dissipation devices 206 may all be of the same size, or, as shown in FIG. 10, they may be of different sizes. The size of the firing chambers 205 and energy dissipation devices 206 determine the size of the fuel droplets dispensed therefrom. Consequently, as described in more detail below, the embodiment of the invention shown in FIG. 10 enables the delivery of two different sized fuel droplets from each fluid feed channel 202(a) and 202(b). Thus, each of the two different fuel-types can be delivered in two different sizes of fuel droplets. Of course, in other embodiments of the invention, various different sized firing chambers 205 and energy dissipation devices 206 could be used. For example, feed channel 202(a) could employ two different sized firing chambers 205 (allowing the delivery of two sizes of fuel droplets of the first fuel type) and feed channel 202(b) could employ one size of firing chambers (allowing the delivery of one size of fuel droplets of the second fuel type).

Now, with reference to FIGS. 1–10, a preferred operation of the system will be described in more detail. In operation, the flow path of air through the fuel injector 14 begins at the air filter 24. Air is drawn into the fuel injector either by an air pump (not shown) or by the vacuum created by the motion of the piston(s) 107 in the combustion chamber(s) 17. Air flows through the air filter 24, into the main body 15, beneath the drop ejector 30, out of the main body 15, and into the intake manifold 16. According to this exemplary description, the fuel injector 14 delivers two different fuel-types. Accordingly, the flow path of the fuel begins at the fuel reservoirs 18(a) and 18(b). The respective fuels flow in corresponding low pressure conduits (e.g. less than about 3 psi) from the fuel reservoirs 18(a) and 18(b) to the main body 15, then through corresponding resiliently deformable conduits at a low pressure (e.g. again less than about 3 psi) to the fuel inlets 41(a) and 41(b) on the slide body 26 (FIG. 4). The respective fuels flow through the pressure regulators 32(a) and 32(b), through several slots in the standpipe (not shown) in the bottom of the housing 28 to the drop ejector 30. The pressure regulators 32(a) and 32(b) maintain slight negative pressures (to create a backpressure) at the back of the drop ejector 30 so that the respective fuels do not drool or run out of the drop ejector 30 during non-use. The fuels are drawn out of the respective pressure regulators 32(a) and 32(b) and into the drop ejector 30 by the capillary action of the fuels within the drop ejector 30. The fuels flow into their respective fluid feed channels 202(a) and 202(b) and then into the respective plurality of fluid feed slots 204. Fixed quantum droplets of the respective fuels are ejected from the drop ejector 30. Control circuit 20 controls the volume ratio of the respective fuels ejected from the drop ejector 30, and the volume ratio can be changed during operation of the engine.

Referring to FIG. 7, actuation of throttle cable 22, as indicated by the arrow 87, causes the throttle wheel 48 to rotate, as indicated by the arrow 88, and the slide body 26 to move up and down, as indicated by the arrow 89. The slide body 26 normally sits at the bottom of fuel injector housing 15, blocking the airway between the air filter 24 and the combustion chamber 17. The slide body 26 is biased toward this position by compression springs 46. When the throttle cable 22 is pulled away from the main body 15, the throttle cable 22 causes the throttle wheel 48 to rotate, which, in turn, causes the second throttle cable 54 to pull the slide body 26 upward and compress the compression springs 46. The second throttle cable 54 passes through the guide 45, and its motion is redirected from horizontal to vertical as illustrated in FIG. 7. The second throttle cable 54 is attached to the loop member 40 on the slide body top 35. When the slide body 26 moves upward, more of the airway between the air filter 24 and the combustion chamber 17 is uncovered and more air is permitted to flow into the fuel injector 14. The position sensor 52 detects the rotation of the throttle wheel 48 and sends a signal to the control circuit 20 indicating that more air is flowing into the fuel injector. The control circuit 20 adjusts the amount of fuel ejected from the drop ejector 30, and thus, the amount of fuel vapor provided to the combustion chamber 17 using any number of air/fuel ratio control strategies.

As shown in FIG. 10, the two different sized firing chambers 205 allow the respective fuels to be ejected from the drop ejector 30 in two different sized fuel droplets, i.e., different volumes. Depending upon the particular embodiment of the invention, the fuel droplets of each fuel-type could be ejected in a single fixed quantum or in any number of other fixed quantums simply by adjusting the number and sizes of the firing chambers 205. For example, for each fuel type, there can be one or more sizes of firing chambers 205. When the firing chambers 205 are of different sizes, the size of the fuel droplets ejected from the drop ejector 30 can be controlled at any given time by selectively activating certain of the firing chambers 205. For example, in the embodiment of the invention shown in FIG. 10 having two different sized firing chambers 205, relatively larger fuel droplets can be ejected from the drop ejector 30 by selectively activating only the energy dissipation devices 206 in the relatively larger firing chambers 205. Similarly, relatively smaller fuel droplets can be ejected from the drop ejector 30 by selectively activating only the energy dissipation devices 206 in the relatively smaller firing chambers 205. For example, during a cold-start of an internal combustion engine (starting the engine when it is at approximately ambient temperature), it has been found to be desirable to eject relatively smaller droplets of fuel from the drop ejector 30. The relatively smaller fuel droplets tend to remain entrained in the airflow and not condense on the cold metal internal surfaces, thereby obviating the need to provide a higher volume of fuel to the combustion chamber during a cold start. Preferably, these relatively smaller fuel droplets are smaller than 30 microns in diameter. Therefore, during a cold start, the control circuit 20 causes only the relatively smaller firing chambers 205 to eject fuel droplets. After the cold start, and after the engine has heated up, the control circuit 20 may cause only the relatively larger firing chambers 205 to eject fuel droplets, since it has been determined that relatively larger fuel droplets tend to combust more efficiently during the normal operating temperature of the engine. This method of operating the described embodiment results in lower emissions because there is less unburned fuel expelled from the engine during cold start conditions, as compared to conventional methods. This method of operation can be implemented with either a single fuel type or multiple fuel types.

Regardless of the number of different sized firing chambers 205 used in the particular embodiment of the invention, the fuel droplets are ejected from the fuel ejector 30 in discrete, fixed quantums in a drop-by-drop fashion vertically downward into a fast flow of air channeled beneath the slide body 26. When the droplets reach the air stream, their flight path changes from vertical to horizontal in this example. The airflow is designed such that mixing occurs between the air and the droplets of fuel, resulting in a combustible vapor. The combustible vapor is provided to the combustion chamber 17 through intake valve 101. Where, as shown in FIGS. 2, 3, 4, 6 and 9, the fuel injector 14 is configured to receive and dispense two or more fuel-types, the different fuel-types are dispensed into the air stream below the fuel ejector 30, where the different fuel-types are mixed in the air stream before being delivered to the combustion chamber. While the use of multiple fluid feed channels 202 has been described in connection with the delivery of multiple fuel-types, it is also contemplated and within the scope of the invention to deliver and mix other types of fluids, such as fuel injector cleaners, octane boosters, water absorbers, valve cleaners, etc. through the fuel injector 14.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements. Further, the use of the words "first", "second", and the like do not alone imply any temporal order to the elements identified. The invention is limited by the following claims.

What is claimed is:

1. A fuel injector, comprising:
    a first fluid input for receiving a first fluid;
    a second fluid input for receiving a second fluid; and
    a drop ejector configured to eject a variably determined number of discrete droplets of fluid, wherein said drop ejector is further configured to receive said first and second fluids and to eject discrete droplets of said first fluid and discrete droplets of said second fluid.

2. The fuel injector of claim 1, wherein at least one of said first liquid and said second liquid is a combustible fuel.

3. The fuel injector of claim 1, wherein said drop ejector is further configured to eject said discrete droplets of said first fluid and said discrete droplets of said second fluid substantially simultaneously.

4. The fuel injector of claim 1, wherein said drop ejector further comprises a first fluid feed channel and a second fluid feed channel, said first fluid feed channel being configured to receive said first fluid and said second fluid feed channel being configured to receive said second fluid.

5. The fuel injector of claim 1, wherein said drop ejector further comprises a first plurality of firing chambers and a second plurality of firing chambers, wherein said first plurality of firing chambers are configured to receive said first fluid and said second plurality of firing chambers are configured to receive said second fluid.

6. The fuel injector of claim 5, wherein said first plurality of firing chambers includes a first set of firing chambers wherein each firing chamber in said first set has a first volume, and wherein said first plurality of firing chambers further includes a second set of firing chambers wherein each firing chamber in said second set has a second volume.

7. The fuel injector of claim 1, further comprising a control circuit configured to selectively adjust a volume ratio of said first fluid ejected from said drop ejector relative to said second fluid ejected from said drop ejector.

8. The fuel injector of claim 1, further comprising an air flow control valve configured to selectively allow air to pass through said ejected fluid droplets so as to create a vaporized mixture from said first and second fluids.

9. A fuel injector, comprising:
    a drop ejector configured to eject a variably determined number of discrete droplets of fluid; and
    wherein said drop ejector includes a first set of firing chambers and a second set of firing chambers, wherein each firing chamber of said first set has a first volume, and wherein each firing chamber of said second set has a second volume.

10. The fuel injector of claim 8, further comprising a control circuit configured to selectively activate said first set of firing chambers and said second set of firing chambers.

11. The fuel injector of claim 9, wherein said control circuit is configured to deactivate said second set of firing chambers when said first set of firing chambers is activated and to deactivate said first set of firing chambers when said second set of firing chambers is activated.

12. The fuel injector of claim 9,
    wherein said first volume is smaller than said second volume; and
    wherein said first set of firing chambers is activated during a cold start of an internal combustion engine and said second set of firing chambers is activated during operation of said engine at a normal operation temperature.

13. The fuel injector of claim 12, wherein each firing chamber of said first set is configured to eject a fluid droplet having a diameter less than 30 microns.

14. A method of delivering fluid to a combustion chamber of an internal combustion engine, comprising:
   ejecting a variably determined number of discrete droplets of a first fluid from a drop ejector;
   ejecting a variably determined number of discrete droplets of a second fluid from said drop ejector; and
   vaporizing and mixing said discrete droplets of said first and second fluids.

15. The method of claim 14, wherein said vaporizing step comprises passing an air stream through said discrete droplets of said first and second fluids.

16. The method of claim 14, wherein at least one of said first and second fluids comprises a combustible fuel.

17. The method of claim 14, wherein said step of ejecting discrete droplets of a first fluid comprises selectively ejecting discrete droplets of a first size during a first time period and selectively ejecting discrete droplets of a second size during a second time period.

18. The method of claim 17, wherein said first size is smaller than said second size, and wherein said droplets of said first size are ejected during a cold start of the engine, and wherein said droplets of said second size are ejected during operation of the engine at a normal operating temperature.

19. The method of claim 18, wherein said first size comprises a diameter of less than 30 microns.

20. A method of delivering fuel to a combustion chamber of an internal combustion engine, comprising:
   selectively ejecting a variably determined number of discrete fuel droplets of a first size from a drop ejector;
   selectively ejecting a variably determined number of discrete fuel droplets of a second size from a drop ejector; and
   vaporizing said ejected fuel droplets.

21. The method of claim 20, wherein said fuel droplets of said first size are ejected during a first time period, and said fuel droplets of said second size are ejected during a second time period.

22. The method of claim 21, wherein said first size is smaller than said second size, and wherein said droplets of said first size are ejected during a cold start of the engine, and wherein said droplets of said second size are ejected during operation of the engine at a normal operating temperature.

23. The method of claim 22, wherein said first size comprises a diameter of less than 30 microns.

24. A fuel consumption device, comprising:
   an internal combustion engine;
   a fuel delivery system coupled to said engine; and
   wherein said fuel delivery system includes means for delivering a variably determined number of discrete droplets of a first combustible fuel and a variably determined number of discrete droplets of a second fluid substantially simultaneously.

25. The fuel consumption device of claim 24, wherein said second fluid is a combustible fuel.

26. The fuel consumption device of claim 24, wherein said fuel delivery system further includes a means for vaporizing and mixing said discrete droplets of said first combustible fuel and said discrete droplets of said second fluid.

27. A fuel consumption device, comprising:
   an internal combustion engine;
   a fuel delivery system coupled to said engine; and
   wherein said fuel delivery system includes means for selectively delivering a variably determined number of discrete fuel droplets of at least a first size and a second size.

* * * * *